(12) United States Patent
Rosenschild

(10) Patent No.: US 11,088,728 B2
(45) Date of Patent: Aug. 10, 2021

(54) DISTRIBUTED ANTENNA SYSTEMS OVER GENERAL USE NETWORK INFRASTRUCTURES

(71) Applicant: CommScope Technologies LLC, Hickory, NC (US)

(72) Inventor: Klaus Uwe Rosenschild, Donauwörth (DE)

(73) Assignee: CommScope Technologies LLC, Hickory, NC (US)

( * ) Notice: Subject to any disclaimer, the term of this patent is extended or adjusted under 35 U.S.C. 154(b) by 66 days.

(21) Appl. No.: 16/737,740

(22) Filed: Jan. 8, 2020

(65) Prior Publication Data

US 2020/0266856 A1 Aug. 20, 2020

Related U.S. Application Data

(60) Provisional application No. 62/808,125, filed on Feb. 20, 2019.

(51) Int. Cl.
*H04L 12/26* (2006.01)
*H04B 7/024* (2017.01)
(Continued)

(52) U.S. Cl.
CPC ....... *H04B 7/024* (2013.01); *H04B 10/25753* (2013.01); *H04W 48/16* (2013.01); *H04W 88/085* (2013.01); *H04W 88/10* (2013.01)

(58) Field of Classification Search
CPC .. H04B 10/25753; H04B 7/022; H04B 7/024; H04W 24/02; H04W 48/16; H04W 88/085; H04W 88/10; H04W 92/12
See application file for complete search history.

(56) References Cited

U.S. PATENT DOCUMENTS

2013/0028218 A1  1/2013 Chun et al.
2013/0051278 A1*  2/2013 Watkins ............ H04W 28/0247
                                                       370/254

(Continued)

FOREIGN PATENT DOCUMENTS

KR    20170117303 A    10/2017
KR    20190016555 A    2/2019

OTHER PUBLICATIONS

International Searching Authority, International Search Report and Written Opinion from PCT Application No. PCT/US2020/012797, from Foreign Counterpart to U.S. Appl. No. 16/137,740, dated May 4, 2020, pp. 1 through 13, Published: WO.

*Primary Examiner* — Minh Trang T Nguyen
(74) *Attorney, Agent, or Firm* — Fogg & Powers LLC

(57) ABSTRACT

Distributed antenna systems over general use network infrastructures are provided. In one embodiment, a distributed antenna system comprises: a central area node (CAN) coupled to a backbone network, wherein the CAN is configured to communicatively couple to at least one base station via the network, and to communicatively couple to at least one wireless access point via the network. The distributed antenna system is configured to use virtual cables implemented using the network, each of the virtual cables defined by a respective dedicated data channel on the network. The CAN is coupled to the base station and wireless access point using at least some of the virtual cables. Downlink and uplink transport signals are transported between the CAN and the wireless access point through said virtual cables. The downlink transport signals are generated from base station downlink signals and base station uplink signals are generated from the uplink transport signals.

29 Claims, 13 Drawing Sheets

(51) Int. Cl.
  *H04B 10/2575* (2013.01)
  *H04W 88/10* (2009.01)
  *H04W 48/16* (2009.01)
  *H04W 88/08* (2009.01)

(56) References Cited

U.S. PATENT DOCUMENTS

2013/0201916 A1  8/2013  Kummetz et al.
2014/0101711 A1  4/2014  Rakib

* cited by examiner

DISTRIBUTED ANTENNA SYSTEMS OVER GENERAL USE NETWORK INFRASTRUCTURES

CROSS-REFERENCE TO RELATED APPLICATIONS

This U.S. Patent Application claims priority to, and the benefit of, U.S. Provisional Patent Application No. 62/808,125, titled "DISTRIBUTED ANTENNA SYSTEMS OVER GENERAL USE NETWORK INFRASTRUCTURES", filed on Feb. 20, 2019, which is incorporated herein by reference in its entirety.

BACKGROUND

A Distributed Antenna System (DAS) typically includes at least one master unit that is communicatively coupled with a plurality of remote antenna units. A DAS is typically used to improve the wireless service coverage provided by one or more base stations that are coupled to the DAS through the master unit. The wireless service provided by the base stations can be included, for example, telecommunications and data services such as commercial cellular service and/or public safety wireless communications. The cable infrastructure between the master unit and the remote units typically comprises a point-to-multi-point system of dedicated cables (for example, copper or fiber optic) that connects the master unit with the plurality of remote units. The utilization of a dedicated cable system designed specifically for use in the DAS ensures that that the DAS infrastructure will be able to support the transport of communications traffic between the base stations and the remote antenna units. However, such a dedicated cable system has several inherent drawbacks. First, the dedicated cable system represents an investment in equipment resources that serves only a single purpose and cannot be leveraged to support other non-DAS communications needs. Second, the dedicated cable system must be designed with handling a maximum communications traffic load in mind, even though the normal expected communications traffic load may be considerably less. Third, if an extension of the DAS is needed, the dedicated cable system will need to be upgraded by installing additional lengths of dedicated cable.

SUMMARY

In one embodiment, a distributed antenna system comprises: a central area node communicatively coupled to a backbone network, wherein the central area node is configured to communicatively couple to at least one base station via the backbone network, the central area node further configured to communicatively couple to at least one wireless access point via the backbone network; wherein the distributed antenna system is configured to use a plurality of virtual cables implemented using the backbone network, each of the plurality of virtual cables defined by a respective dedicated data channel on the backbone network; wherein the central area node is communicatively coupled to the at least one base station and the at least one wireless access point using at least some of the virtual cables; and wherein downlink transport signals and uplink transport signals are transported between the central area node and the wireless access point through said at least some of the virtual cables, wherein the downlink transport signals are generated from base station downlink signals and base station uplink signals are generated from the uplink transport signals.

DRAWINGS

Embodiments of the present disclosure can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

As described below, at least some of the embodiments of the present disclosure provide for distributed antenna systems that, at least in part, replaces the use of dedicated cables to transport data between components of a DAS by instead using general purpose public infrastructure backbone networks to establish virtual cable connections between DAS components. Such public infrastructure backbone networks are typically used to carry digital data for services to the public such as but not limited to telephony, internet, television and other data and/or entertainment services. With one or more of the embodiments disclosed herein, such backbone networks are leveraged to further transport the digital transmission of RF signals of a DAS. Such embodiments provide an advantage in flexibility over DAS that employ dedicated cable system. For example, transport resources between DAS components can be allocated on the backbone network according to actual need. DAS re-configurations can be performed virtually without the need to install new cables. DAS coverage expansions and extensions can be achieved by establishing connections between new DAS components and the backbone network. DAS components can be distributed across the backbone network and need not have a physical proximity with each other. Multiple DAS systems can be implemented via a backbone network, and DAS components can be re-assigned between different DAS systems without cable changes, or redundancy scenarios established. Moreover, as explained below, a common management system (such as an ONAP, Open Networking Automation Platform, for example) can coordinate both changes in the infrastructure and the DAS system (independent of equipment component suppliers).

Figure 1:
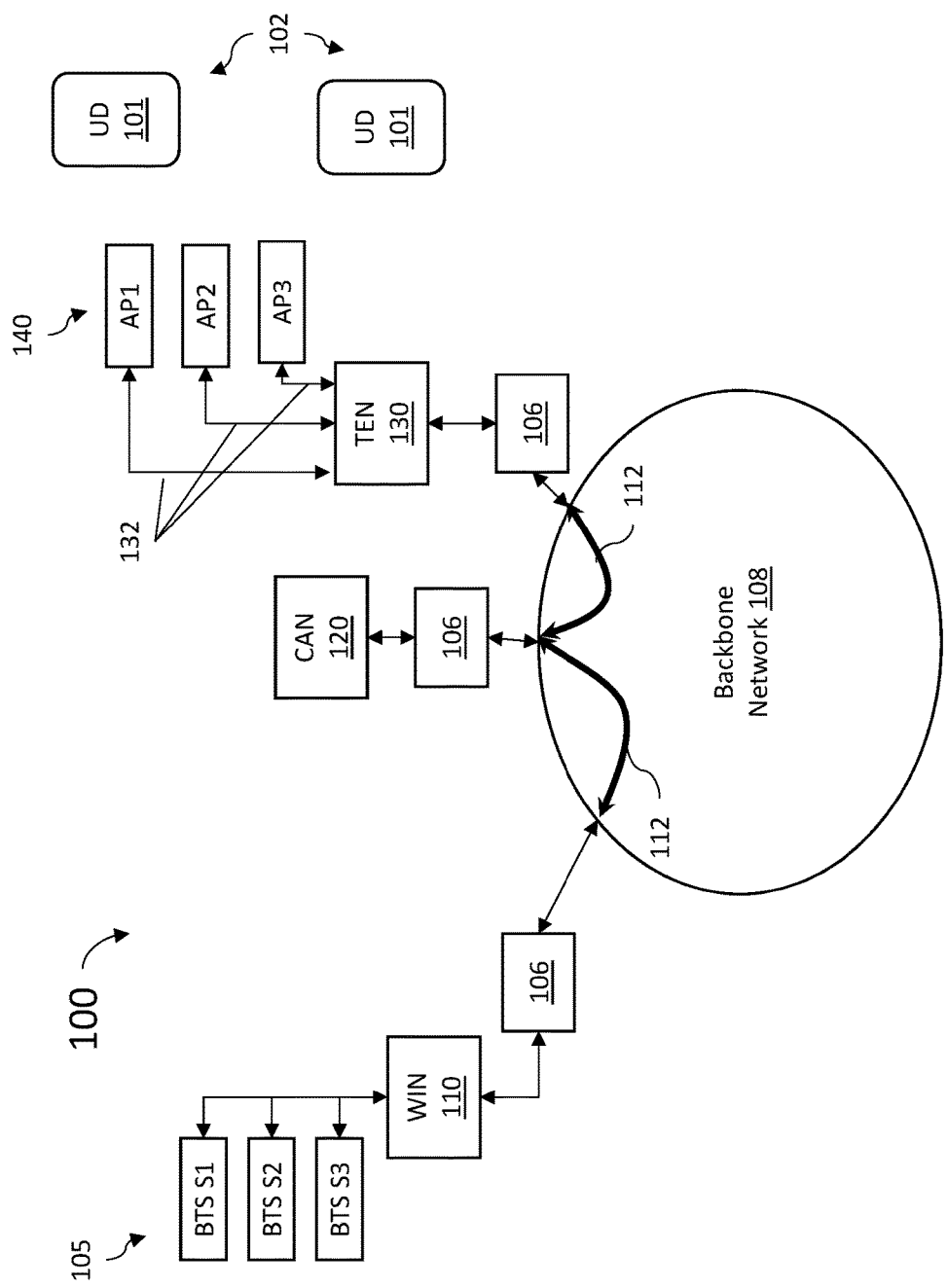
FIG. 1 is a diagram illustrating an example Distributed Antenna System embodiment.

FIG. 1 is a diagram illustrating a Distributed Antenna System 100 of one embodiment of the present disclosure. As shown in FIG. 1, in one implementation DAS 100 comprises a wide-area integration node (WIN) 110, a central area node (CAN) 120, a transport extension node (TEN) 130, and a plurality of wireless access points 140. The WIN 110 and CAN 120 operate in conjunction with each other to implement the master unit (MU) function for DAS 100 that establishes communications with one or more base stations 105. In the particular embodiment shown in FIG. 1, the one or more base stations 105 coupled to WIN 110 include the three base stations BTS S1, BTS S2 and BTS S3. The plurality of access points 140 define the remote antenna units of the DAS 100 which establish wireless connectivity with the one or more user devices (UD) 101 (such as tablets or cellular telephone, for example) located within the coverage area 102 of the DAS 100.

In the downlink direction, DAS 100 is configured to receive downlink radio frequency signals from the base stations 105. These signals may also be referred to as "base station downlink signals." Each base station downlink signal includes one or more radio frequency channels used for communicating in the downlink direction with user devices 101 over a relevant wireless air interface. In the uplink direction, DAS 100 is configured to receive respective uplink radio frequency signals from the user equipment 101 within the coverage area of the DAS 100, and transport those signals as "base station uplink signals" to the base stations 105.

In the example embodiment of FIG. 1, the WIN 110, CAN 120 and TEN 130 are each communicatively coupled to a backbone network 108. In some embodiments, the backbone network 108 may comprise a Synchronous Digital Hierarchy (SDH), Sonet (Synchronous Optical Network), Optical Transport Network (OTN) or other network technology. In some embodiments, the backbone network 108 may comprise the Internet or other public infrastructure network, for example, operated by a government or private utility entity, that transports data for a plurality of different services and for a plurality of different entities. In some embodiments, the backbone network 108 is an optical network and each of the WIN 110, CAN 120 and TEN 130 may be coupled to the backbone network 108 via a respective add/drop multiplexer (ADM) 106. In some embodiments, the backbone network 108 may include one or more segments that comprise an Ethernet network, or may be entirely implemented as an Ethernet network. Therefore, for any of the embodiments described herein, the respective add/drop multiplexer (ADM) 106 may be replaced by an Ethernet switch 106 for those instances where the BTS 105, WIN 110, CAN 120, TEN 130 and/or AP 140 are coupled to portions of the backbone network 108 comprising the Ethernet network. In some embodiments, the Ethernet switch may support for one or more quality of service standards or techniques.

With embodiments of the present disclosure, bandwidth on the backbone network 108 is allocated to the operation of the DAS 100 in the form of virtual cables 112 created between the WIN 110, CAN 120 and TEN 130. These virtual cables 112 are not dedicated physical cables. Instead, the virtual cables 112 each define dedicated data channels on the backbone network 108 for carrying digital transmission of RF signals and control data between components of the DAS 100. Accordingly, in some embodiments, each virtual cable 112 may comprise distinct uplink and downlink communications subchannels. In the embodiment of FIG. 1, a first virtual cable 112 couples the WIN 110 to the CAN 120 while a second virtual cable 112 couples the CAN 120 to the TEN 130.

Typically, each base station downlink signal is received at the WIN 110 from the one or more base stations 105 as analog radio frequency (RF) signals, though in some embodiments one or more of the base station signals are received in a digital form (for example, in a digital baseband form complying with the Common Public Radio Interface ("CPRI") protocol, Open Radio Equipment Interface ("ORI") protocol, the Open Base Station Standard Initiative ("OBSAI") protocol, or other protocol). The base station downlink signals are digitized or otherwise formatted by the WIN 110 into a digital signal, and the resulting downlink transport signal transported to the CAN 120 over the first virtual cable 112 that couples the WIN 110 to the CAN 120. The CAN 120 functions as the head-end unit of the DAS 100 and may be used to coordinate the operations of WIN 110, TEN 130 and wireless access points 140. For example, the CAN 120 may operate to forward downlink transport signals to TEN 130 over the second virtual cable 112 that couples the CAN 120 to TEN 130 and receive uplink transport signals from the TEN 130 over the second virtual cable 112. In some embodiments the CAN 120 implements a switching matrix that provides for switching services carried through and/or between the virtual cables 112. In some embodiments the CAN 120 implements functionalities that permit copying received downlink signals to multiple wireless access points 140 destinations, and to combine uplink signals received from multiple wireless access points 140. The CAN 120 may also further include interfaces or other means for providing external access to the DAS 100 (for example, via ONAP as described below).

In the embodiment shown in FIG. 1, the DAS 100 includes the single TEN 130. However, in alternate embodiments discussed below, the DAS 100 may include multiple TEN units in which case virtual cables 112 for each TEN would be established to the CAN 120 through the backbone network 108.

From the TEN 130, patch cables 132 are distributed to one or more antenna locations where access points 140 are deployed. Each access point 140 receives the base station downlink RF signals, converts the digital signals to analog radio frequency (RF) signals for over-the-air transmission, and broadcasts (radiates) the base station downlink signals as wireless downlink RF signals to user equipment 101 within the coverage area 102 of the DAS 100.

Uplink RF signals transmitted by the user equipment 101 located within the coverage area 102 of the DAS 100 are received by the access points 140, digitized or otherwise converted to digital signals, and received by the TEN 130. These uplink transport signals are formatted by the TEN 130 for transport to the CAN 120 over the virtual cable 112 that couples the TEN 130 to the CAN 120. The CAN 120 processes the digital uplink signals received from the TEN for further transport to the WIN 110. This processing may involve, among other things, combining or summing uplink signals received from the multiple access points 140 in order to produce a composite uplink base station signal. The composite base station uplink signal is transported to the WIN 110 over the virtual cable 112 that couples the WIN 110 to the CAN 120. Ultimately, composite base station uplink signals are output from the WIN 110 to the one or more base stations 105. In this way, the DAS 100 increases the coverage area available for both uplink and downlink communications between user equipment 101 and the base stations 105.

Figure 1A:
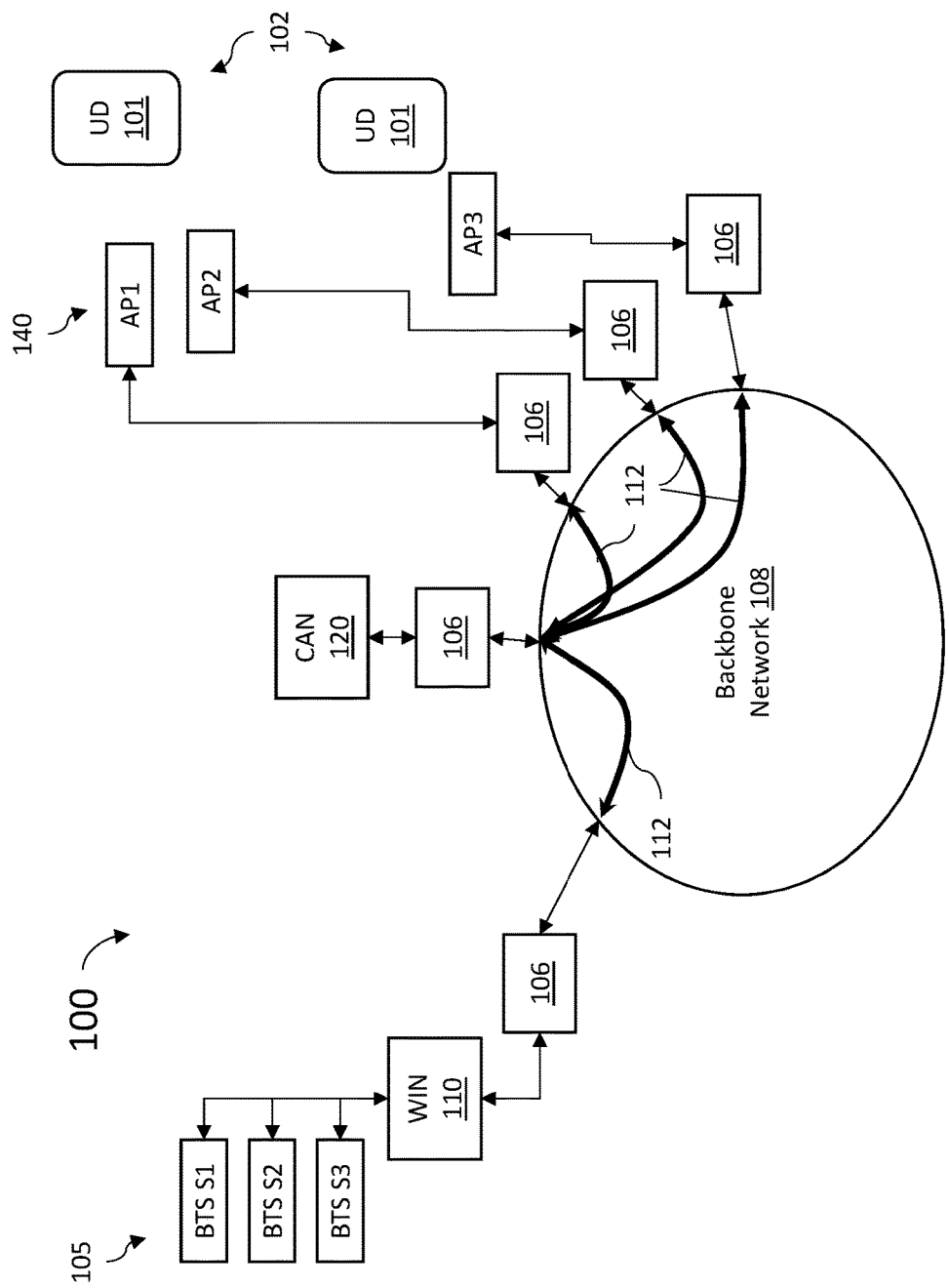
FIGS. 1A, 1B and 1C are diagrams illustrating alternate implementations of an example Distributed Antenna System embodiment.

Is should be understood that in alternate embodiments, one or both of WIN and TEN may be omitted as optional. For example, FIG. 1A shown an alternate implementation of DAS 100 where the virtual cables 112 are used to couple the CAN 120 directly to the access points 140 without an intervening TEN 130. In such implementations, the access points 140 may each be connected to the backbone network 108 directly, such as through respective add-drop multiplexers 106. Such an alternate configuration may be utilized for an alternate implementation for any of the other embodiments disclosed herein, or for use in combination with any of the other embodiments disclosed herein.

Figure 1B:
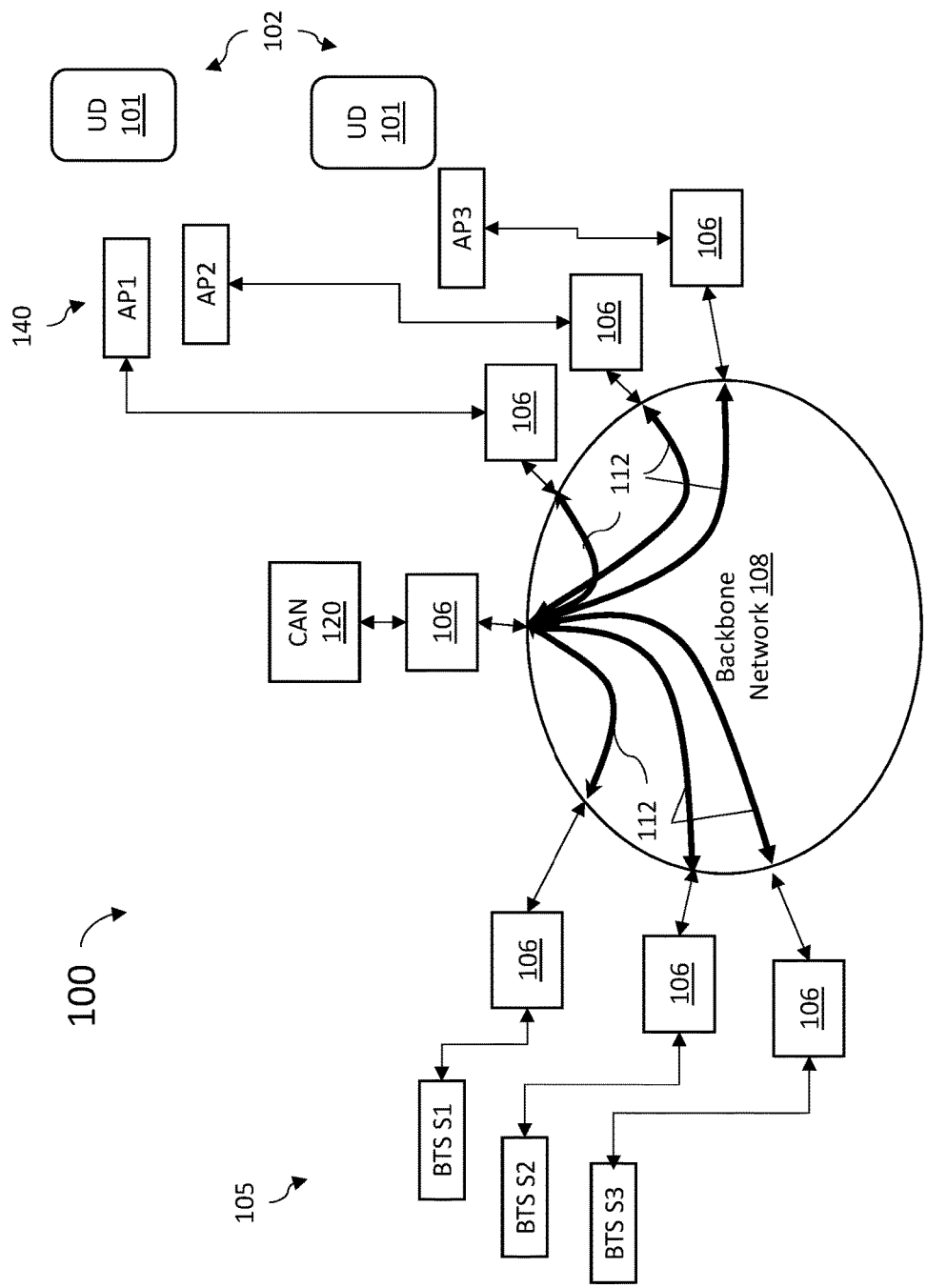

In some alternate implementations, shown in FIG. 1B, virtual cables 112 may also potentially be used to couple the CAN 120 directly to one or more base stations 105 without an intervening WIN 110. That is, where the base stations 105 are configured to communicate their uplink and downlink base stations signals as digital signals, those signals may be transported by virtual cables 112 directly from such a base station to the CAN 120. In such implementations, the base stations 105 may each be connected to the backbone network 108 directly, such as through respective add-drop multiplexers 106.

Figure 1C:
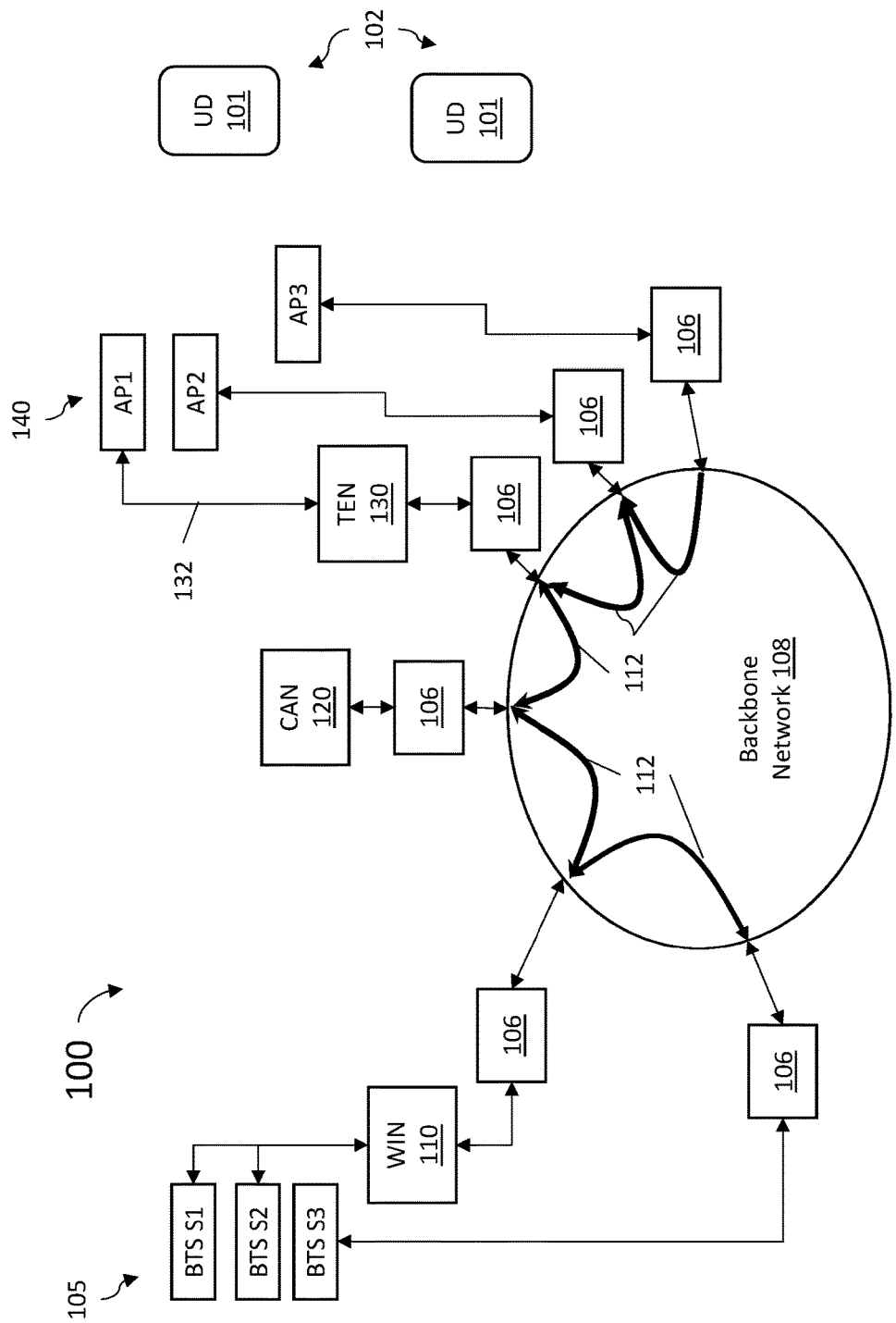

In still other alternate implementations, such as shown in FIG. 1C, virtual cables 112 may also potentially be used to couple the TEN 130 to one or more of the access points 140 over backbone network 108 instead of using patch cables 132. In some embodiments, those access points 140 communicating with TEN 130 via virtual cables 112 may be connected to the backbone network 108 directly, such as through respective add-drop multiplexers 106.

Also as shown in FIG. 1C, in some embodiments virtual cables 112 may also potentially be used to couple a WIN 110 to one or more of the base stations 105 over backbone network 108. Those base stations 105 communicating with WIN 110 via virtual cables 112 may be connected to the backbone network 108 directly, such as through respective add-drop multiplexers 106. Those base stations 105 utilizing virtual cables 112 to communicate with WIN 110 are configured to communicate their uplink and downlink base stations signals as digital signals (for example, using a CPRI protocol).

As mentioned above, the architecture presented by the DAS 100, in any of the FIGS. 1 and 1A-1C, have the benefit of providing flexibility in its ability to adapt the DAS to changing operator needs while avoiding the installation and/or reconfiguration of dedicated cables between DAS components. It should be understood that the alternate configurations described with respect to FIGS. 1 and 1A-1C may be used, either wholly or in part, in conjunction and/or in combination with each other.

Figure 2:
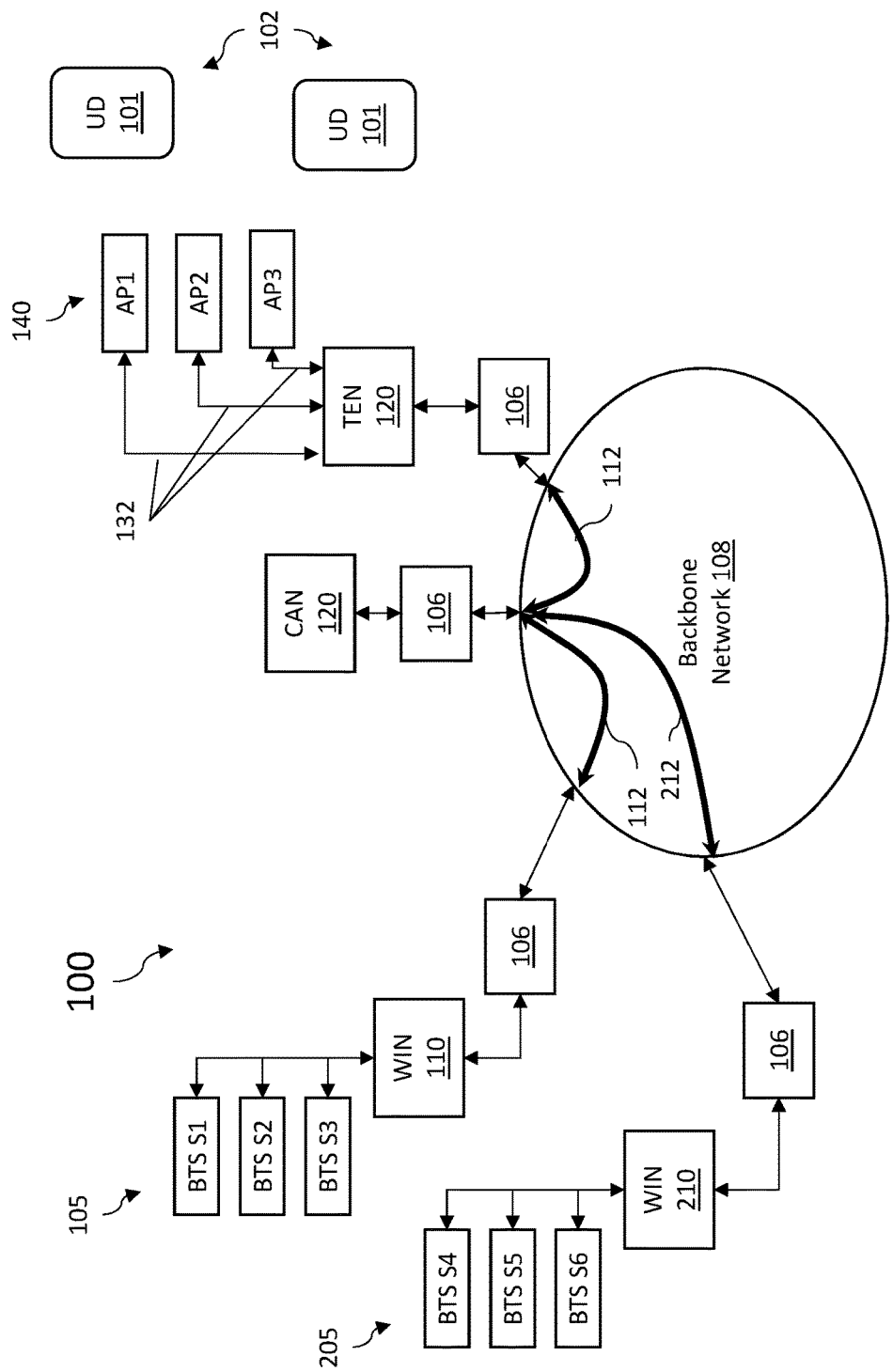
FIG. 2 is a diagram for an example configuration illustrating increasing service capacity of an example Distributed Antenna System embodiment.

FIG. 2 is a diagram illustrating an example configuration of the DAS 100 that increases the service capacity available to user devices 101 within the coverage area 102 supported by the access points 140. In particular, the DAS 100 has been modified in FIG. 2 to include the addition of a second WIN (shown at WIN 210) onto the backbone network 108. While WIN 110 has access to the services of the base stations BTS S1, BTS S2 and BTS S3, the WIN 210 has access to the services of base stations BTS S4, BTS S5 and BTS S6 shown at 205. By reconfiguring the backbone network 108 to establish a new virtual cable 212 between WIN 210 and CAN 120, the CAN 120 may now distribute the combined services of base stations 105 and 205 to the user devices 101 within the coverage area 102 supported by the access points 140. It should be appreciated that in any of the embodiments described herein, the CAN 120 may be configured to manage which base station 105 services are accessible through which of the access points 140. For example, in one implementation, the CAN 120 may pair the services of BTS S1 to a first access point 140 (AP 1), BTS S2 to a second access point 140 (AP 2), and BTS S3 to a third access point 140 (AP 3). At the same time, the additional services of base stations BTS S4, BTS S5 and BTS S6 may similarly be distributed by TEN 130 to specific access points. For example, the services of BTS S4 may be paired to the first access point 140 (AP 1), BTS S5 to the second access point 140 (AP 2), and BTS S6 to the third access point 104 (AP 3). In other implementations, services from a base station may be distributed to, and accessible from, multiple, or all, access points 140.

To accommodate the extra network traffic due to this increase in service capacity, the bandwidth capacity of the virtual cable 112 between the CAN 120 and the TEN 130 may be adjusted to allocate addition backbone network bandwidth capacity. This service expansion benefiting the user devices 101 within the coverage area 102 of DAS 100 is thus accomplished without the necessity of installing or reconfiguring physical cabling between DAS 100 components. Moreover, the WIN 210 may be installed at a location where connection to the new base stations (BTS S4, BTS S5 and BTS S6) and the backbone network 108 is most convenient.

Figure 3:
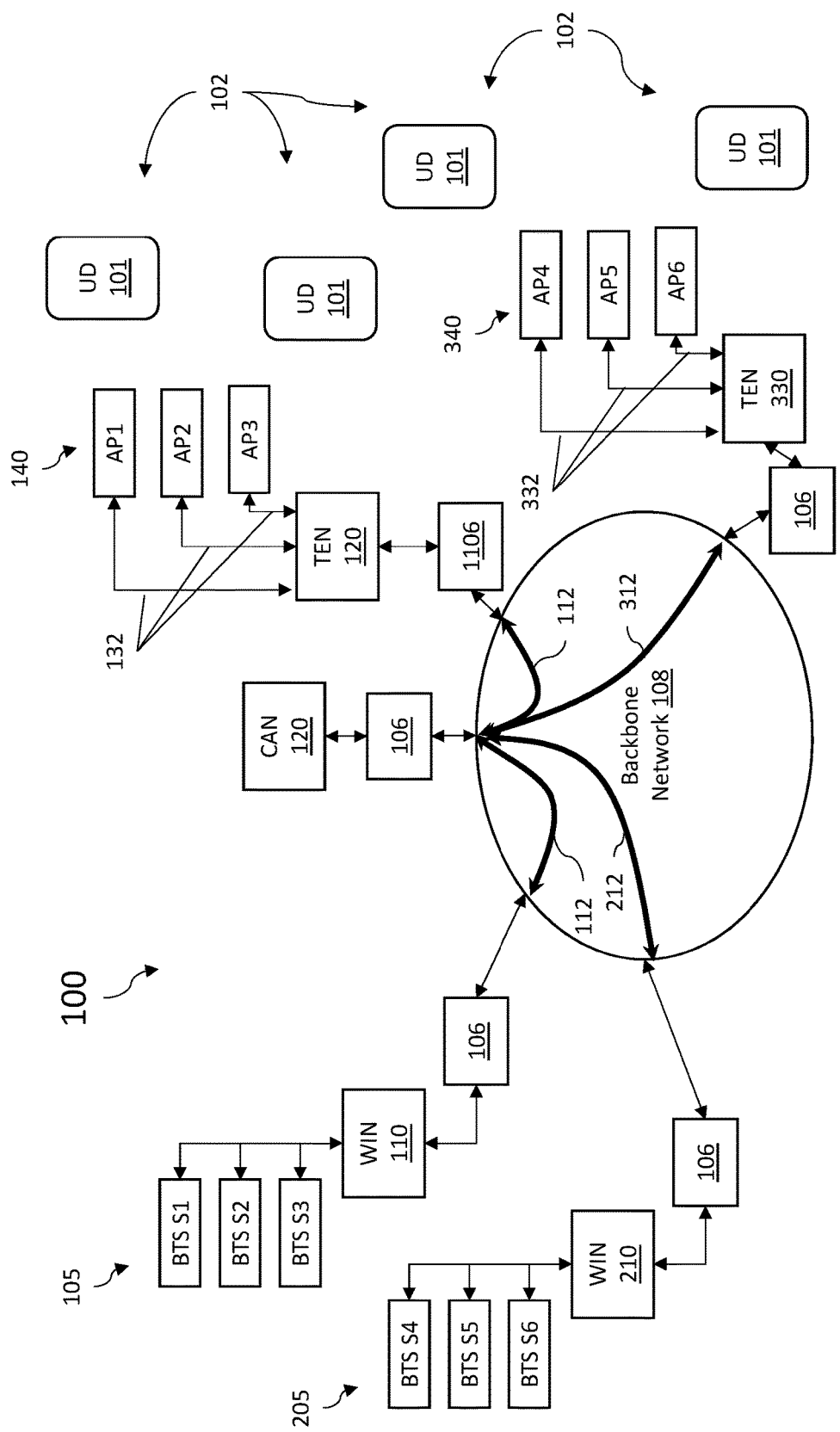
FIG. 3 is a diagram for an example configuration illustrating increasing coverage area of an example Distributed Antenna System embodiment.

FIG. 3 is a diagram illustrating another example configuration of the DAS 100 that increases the effective area of the coverage area 102 by increasing the number of access points, as shown at 340. In this embodiment, an additional TEN (shown at TEN 330) is coupled onto the backbone network 108. From the TEN 330, patch cables 332 are distributed to the additional antenna locations where access points 340 are deployed. By reconfiguring the backbone network 108 to establish another virtual cable 312 between CAN 120 and TEN 330, the CAN 120 may now further distribute the services of base stations 105 and 205 to the user devices 101 within the expanded coverage area 103 supported by the combination of access points 140 and access points 340. This coverage area 102 expansion of DAS 100 is thus accomplished without the necessity of installing or reconfiguring physical cabling between DAS 100 components.

Figure 4:
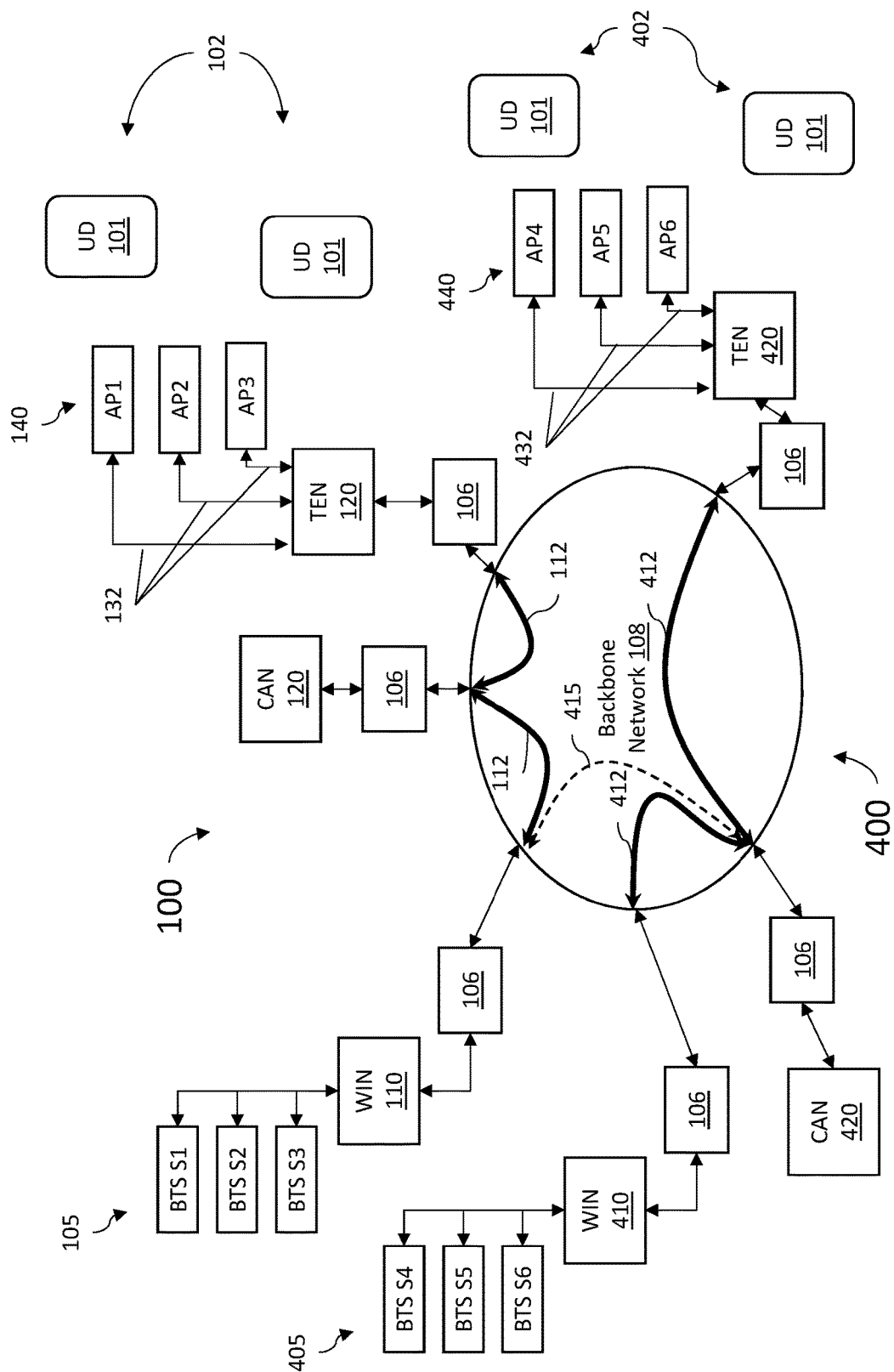
FIG. 4 is a diagram illustrating an example DAS configuration comprising multiple DAS supported over a common backbone network.

FIG. 4 is a diagram illustrating an example DAS configuration where multiple DAS are supported over the backbone network 108. In this example embodiment, the first DAS 100 comprises at least the WIN 110, CAN 120, TEN 130, and the plurality of access points 140. In some implementations, the DAS 100 may optionally be configured with additional WIN and/or TEN coupled to the backbone network 108 such as illustrated in FIGS. 2 and 3 above. A second DAS 400 comprises at least a WIN 410, CAN 420, TEN 430, and a plurality of access points 440, each of which function in an equivalent manner to WIN 110, CAN 120, TEN 130 and access point 140. One or more base stations 405 are coupled to the WIN 410. In the particular embodiment shown in FIG. 4, the one or more base stations 405 include the three base stations BTS S4, BTS S5 and BTS S6.

From the TEN 430, patch cables 432 are distributed to the additional antenna locations where the access points 440 are deployed. DAS 400, via the access points 440, provide wirelesses services to user devices 101 within coverage area 402.

In the downlink direction, DAS 400 is configured to receive downlink radio frequency signals from the base stations 405. These signals may also be referred to as "base station downlink signals." Each base station downlink signal includes one or more radio frequency channels used for communicating in the downlink direction with user devices 101 over a relevant wireless air interface. In the uplink direction, DAS 400 is configured to receive respective uplink radio frequency signals from the user equipment 101 within the coverage area 402 of the DAS 400, and transport those signals as "base station uplink signals" to the base stations 405.

As with DAS 100, bandwidth on the backbone network 108 is allocated to the operation of the DAS 400 in the form of virtual cables 412 created between the WIN 410, CAN 420 and TEN 430. These virtual cables 412 each define dedicated data channels on the backbone network 108 for carrying digital transmission of RF signals and control data between components of the DAS 400. Accordingly, in some embodiments, each virtual cable 412 may comprise distinct uplink and downlink communications subchannels. In the embodiment of FIG. 4, a first virtual cable 412 couples the WIN 410 to the CAN 420 while a second virtual cable 412 couples the CAN 420 to the TEN 430. In some implementations, the DAS 400 may optionally be configured with additional WIN and/or TEN coupled to the backbone network 108 in the same manner as illustrated in FIGS. 2 and 3 above.

In this configuration, multiple DAS systems 100 and 400 are simultaneously supported over the common backbone network 108. Moreover, this configuration supports the ability to selectively reassign DAS components from one DAS to the other by realigning network to rearrange the connection of virtual cables. For example, in one implementation the access points 140 may be located at an office building and normally are provided service from base stations 105. The access points 440 may be located at an events stadium and normally provided service from base stations 405. During an event at the event stadium, base stations 105 can be realigned to increase the coverage capacity at the stadium, for example, by disconnecting the virtual cable 112 from WIN 110 to CAN 120, and creating a new virtual cable (shown at 415) from WIN 110 to CAN 420 so that the services of base stations 105 become available via access points 440 (in addition to the services of base stations 405). Alternatively, in some embodiments, the configuration facilitates redundancy scenarios in the operators of DAS 100 and 400 may shift any of the DAS components from one DAS to the other should a failure of a CAN, TEN, or WIN, or other data link failure occur.

Figure 5:
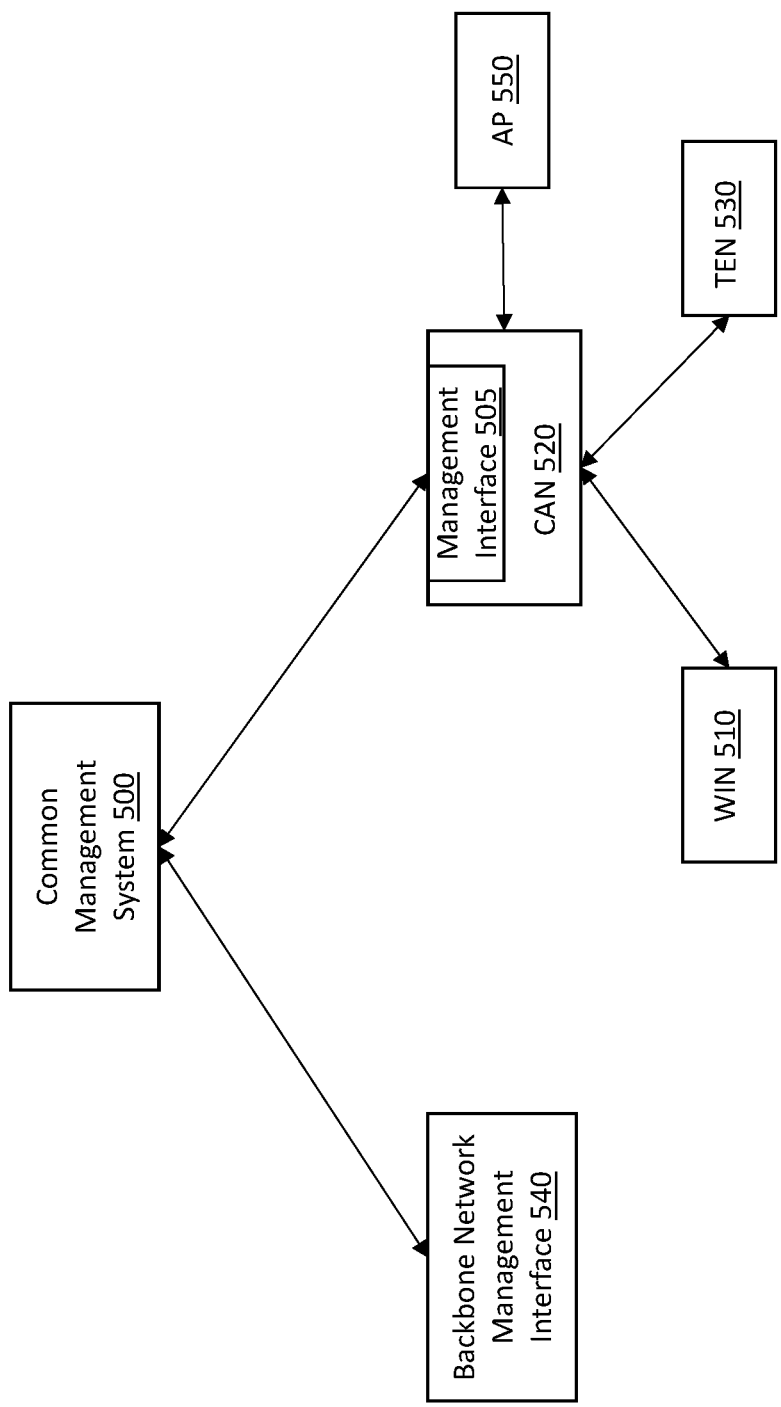
FIG. 5 is a diagram illustrating and example common DAS management system.

As shown in FIG. 5, in some embodiments a common management system 500 (such as an ONAP, Open Networking Automation Platform, for example) can be included to coordinate changes and reconfigurations of a DAS infrastructure and WIN, CAN and TEN components such as any of those disclosed with respect to FIGS. 1-4. Moreover, in some embodiments, the common management system 500 can coordinate changes and reconfigurations of any of the access point 140. For example, as shown in FIG. 5, the CAN 520 may be in communication with an Access Point 550 (either directly or via TEN 530) so that the common management system 500 can send commands to the CAN 520 which are used to implement reconfiguration of the AP 550. The common management system 500 also manages the underlying backbone network 108 at least with respect to creating and modifying virtual cables 112.

For example, in one embodiment a network operator by accessing the common management system 500 can send control commands to a CAN to manage and obtain status information about the DAS (for example, about of the various WIN, CAN, TEN components shown in FIG. 5 as WIN 510, CAN 520, TEN 530). The common management system 500 may be programmed to provide a unified interface to the components of the DAS by interfacing with a management interface 505 in the CAN 520. The CAN 520 in response to commands from the common management system 500 initiates any changes to the DAS and/or collects information by coordinating with the WIN 510 and TEN 530. Similarly, the common management system 500 may communicate with a backbone network management interface 540 to reconfigure aspects of the backbone network 108, such as for virtual cable 112 adding, deleting, switching or reconfiguration (for example, to increase or decrease their bandwidth or other parameter). In some embodiments, management command and information traffic between the common management system 500 and CAN 520 and/or the backbone network management interface 540, may be carried over the backbone network 108 or may instead be carried over a separate network.

It should be understood that the alternate configurations described with respect to FIGS. 1, 1A-1C and 2-5 may be used, either wholly or in part, in conjunction and/or in combination with each other. Moreover, is should be understood that in some embodiments, the DAS may utilize a combination of virtual and physical cables.

Figure 6:
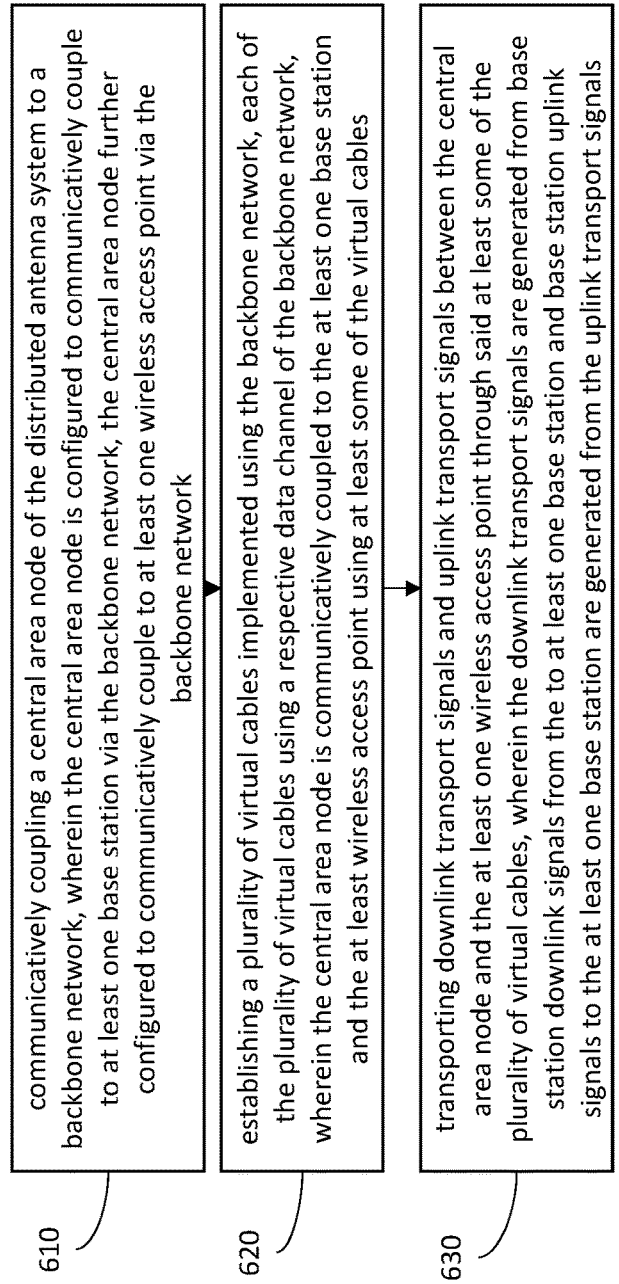
FIG. 6 is flow chart illustrating an example method embodiment for a distributed antenna system.

FIG. 6 is an example embodiment for a method 600 for a distributed antenna system of the present disclosure. It should be understood that the features and elements described herein with respect to the method shown in FIG. 6 and the accompanying description may be used in conjunction with, in combination with, or substituted for elements of any of the other embodiments discussed herein, and vice versa. Further, it should be understood that the functions, structures and other description of elements associated with embodiments of FIG. 6 may apply to like named or described elements for any of the FIGS. 1, 1A-1C, 2-5 and embodiments described therein, and vice versa.

The method begins at 610 with communicatively coupling a central area node of the distributed antenna system to a backbone network, wherein the central area node is configured to communicatively couple to at least one base station via the backbone network, the central area node further configured to communicatively couple to at least one wireless access point via the backbone network. Each base station downlink signal includes one or more radio frequency channels used for communicating in the downlink direction with user devices over a relevant wireless air interface. In the uplink direction, the distributed antenna system is configured to receive respective uplink radio frequency signals from the user equipment within the coverage area of the distributed antenna system, and transport those signals as the base station uplink signals to the base stations. In some embodiment, the method may also optionally include communicatively coupling at least one wide-area integration node of the distributed antenna system to the backbone network. In that case, wide-area integration node can be configured to communicate base station downlink signals and base station uplink signals with the base station. The method may also optionally include communicatively coupling at least one transport extension node of the distributed antenna system to the backbone network, wherein the transport extension node is coupled to the wireless access points.

The method proceeds to 620 with establishing a plurality of virtual cables implemented using the backbone network, each of the plurality of virtual cables using a respective data channel of the backbone network, wherein the central area node is communicatively coupled to the at least one base station and the at least wireless access point using at least some of the virtual cables. The backbone network may comprise a Synchronous Digital Hierarchy (SDH), Sonet (Synchronous Optical Network), Optical Transport Network (OTN), Ethernet, or another network technology. In some embodiments, the backbone network may comprise the Internet or other public infrastructure network that transports data for a plurality of different services and for a plurality of different entities in addition to carrying traffic for the distributed antenna system. In some embodiments, the backbone network may be operated by a government or private utility entity. In some embodiments, each of the wide-area integration node, a central area node and a central area node may be coupled to the backbone network via a respective add/drop multiplexer.

The method proceeds to 630 with transporting downlink transport signals and uplink transport signals between the central area node and the at least one wireless access point through said at least some of the plurality of virtual cables, wherein the downlink transport signals are generated from base station downlink signals from the to at least one base station and base station uplink signals to the at least one base station are generated from the uplink transport signals. As mentioned above, in some embodiments, downlink and uplink transport signals between the central area node and wireless access points may be transported through a transport extension node. The transport extension node may be connected to the wireless access points through patch cables, or alternately via virtual cables over the backbone network. Similarly, for embodiments that include a wide-area integration node, the base stations may optionally be connected to the wide-area integration node via virtual cables over the backbone network when the base station downlink signals and the base station uplink signals are digital signals.

In other words, the components of the DAS (such as the wide-area integration node, central area node, and/or transport extension node) need not be coupled to each other a dedicated cabling system but instead may communicate digital RF and control signals between each other via the backbone network. Each virtual cable may comprise distinct uplink and downlink communications subchannels. However, it should be understood that inclusion of physical patch cables is not precluded. In alternate embodiments, any combinations of virtual and patch cables may be used. For example, patch cables may be utilized where DAS components are conveniently co-located or where virtual cables cannot be established due to lack of access to the backbone network. For example, in some embodiments the transport extension node may be coupled to wireless access points using patch cables distributed to one or more antenna locations where the access points are deployed. In other embodiments, virtual cables on the backbone network may instead be used to connect the transport extension node to one or more of the access points (e.g. remote antenna units) at their remote locations. Moreover, the method may be implemented using any of the DAS configurations described in FIGS. 1, 1A-1C, 2-5, or parts thereof, or other configurations.

Regardless of the DAS configuration, each access point receives the downlink transport signals, converts those digital signals to analog radio frequency (RF) signals for over-the-air transmission, and broadcasts (radiates) the analog RF signals as wireless downlink RF signals to user equipment within the coverage area of the distributed antenna system. Uplink wireless RF signals transmitted by the user equipment located within the coverage area of the distributed antenna system are received by the access points, converted to digital signals, and transmitted up to the central area node as the uplink transport signals.

As illustrated in FIGS. 2-4 above, in some embodiments, the method may also comprise coupling a plurality of wide-area integration nodes to the backbone network, each coupled to a different set of base stations. In some embodiments, the method may comprise coupling a plurality of transport extension nodes to the backbone network, each coupled to a different set of base stations. In such embodiments, each of the wide-area integration nodes and transport extension nodes may each communicate over the backbone network (either with each other or through a central area node) via a respective virtual cable. As such, in some embodiments, the method further comprises expanding the coverage area of the distributed antenna system by coupling one or more additional transport extension nodes to the backbone network and creating a respective virtual cable for each of the one or more additional transport extension nodes. Each of the additional transport extension nodes would be connected to one or more additional access points thus extending the physical area in which user devices may connect to the distributed antenna system. In some embodiments, the method further comprises expanding the service capacity of the distributed antenna system by coupling one or more additional wide-area integration nodes to the backbone network and creating a respective virtual cable for each of the one or more additional wide-area integration nodes. Each of the additional wide-area integration nodes would be connected to one or more additional base stations thus increasing the capacity and wireless services available to user devices within the coverage area of the distributed antenna system.

Figure 7:
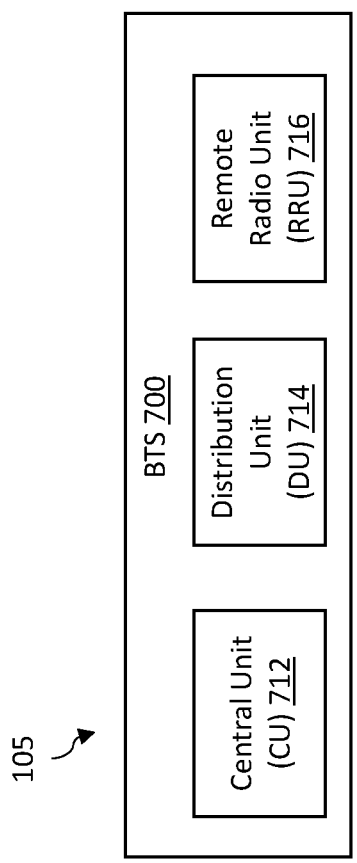
FIG. 7 is a diagram illustrating an example distributed BTS embodiment.
Figure 8:
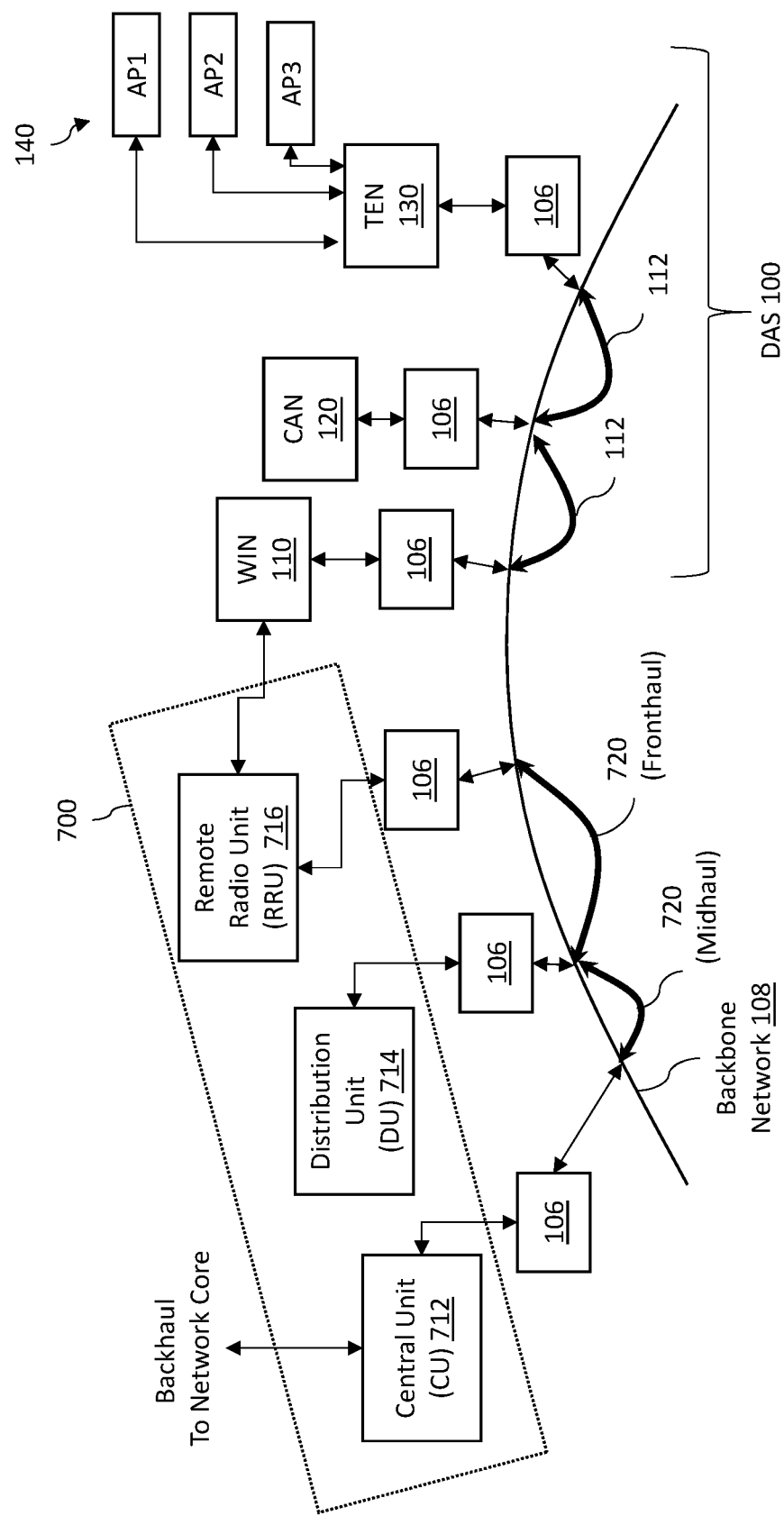
FIGS. 8, 9 and 10 are diagrams illustrating embodiments with example alternate architectures comprising interfaces between a distributed BTS and a DAS.

In some embodiments, such as shown in FIG. 7, the functions of any of the BTS 105 discussed herein may be executed by a distributed BTS 700 comprising a Central Unit (CU) 712, a Distribution Unit (DU) 714 and a Remote Radio Unit (RRU) 716. In some embodiments, the distributed BTS 700 comprises a 3GPP 5G RAN architecture radio base station (known as a gNB) connected to a 5G core network, or may comprise another form of distributed radio base station. Further embodiments may therefore include the implementation of such a distributed BTS 700 by utilizing virtual cable connections via general purpose public infrastructure backbone networks and a DAS implementation as disclosed herein. For example, FIG. 8 illustrates an example embodiment where the CU 712, DU 714 and/or RRU 716 are communicatively coupled via the backbone network 108 via virtual cables 720 that each define dedicated data channels on the backbone network 108 for carrying digital transmission of signals and control data between components of the BTS 700. Each virtual cable 720 may comprise distinct uplink and downlink communications subchannels. In the embodiment of FIG. 8, a first virtual cable 720 forms the midhaul link between the CU 712 and the DU 714. A second virtual cable 720 forms the fronthaul link between the DU 714 and the RRU 716. In alternate configurations, either the midhaul and/or the fronthaul may be carried by virtual cables 720. The DAS 100 then communicates uplink and downlink basestation signals between the WIN 110 and RRU 716 and operates to provide the wireless services of the distributed BTS 700 via the AP 140 as discussed above. As described previously, components such as the CU 712, DU 714 and/or RRU 716 may be coupled to the backbone network 108 and virtual cables 720 by respective add/drop multiplexers or Ethernet switches (shown at 106).

Figure 9:
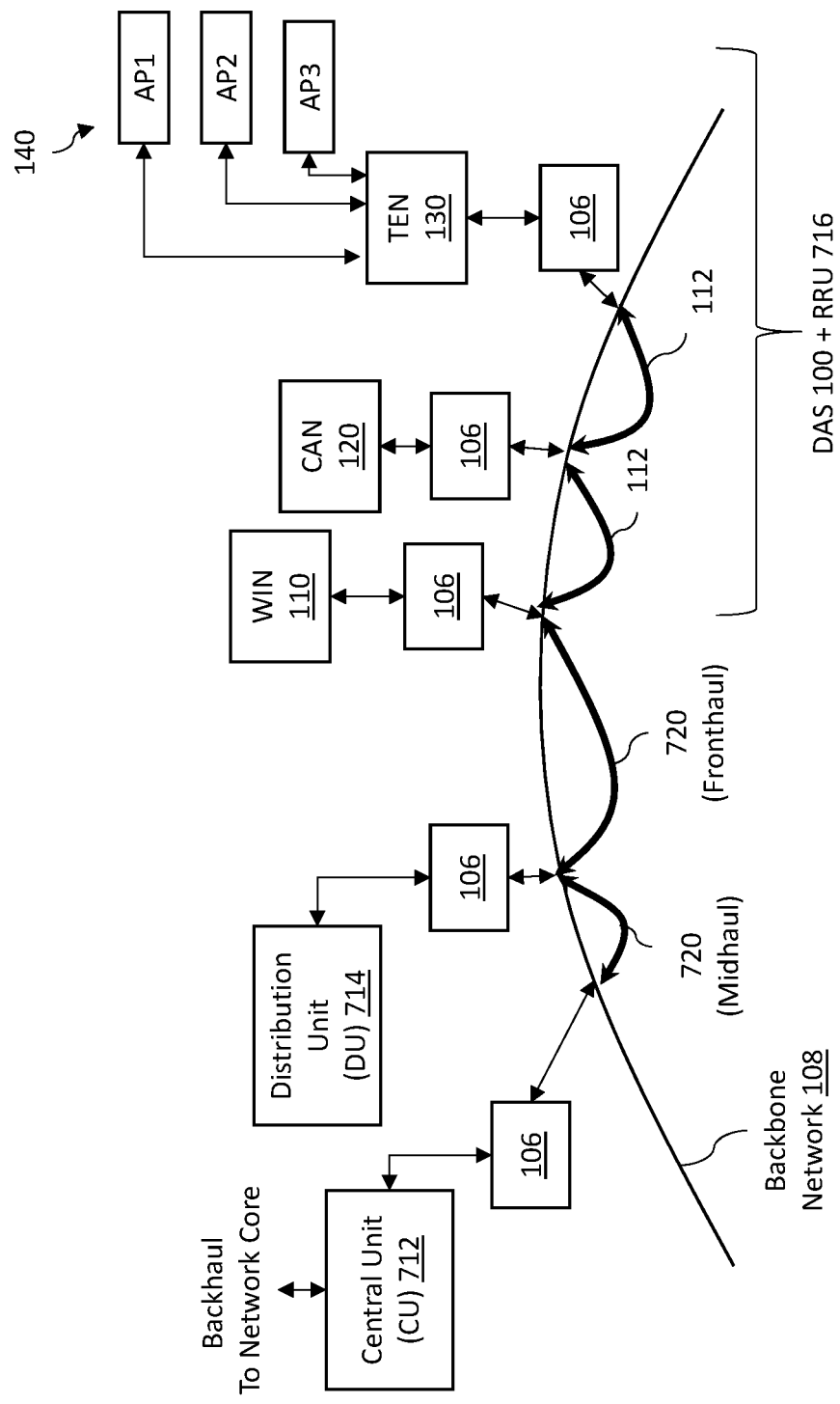
Figure 10:
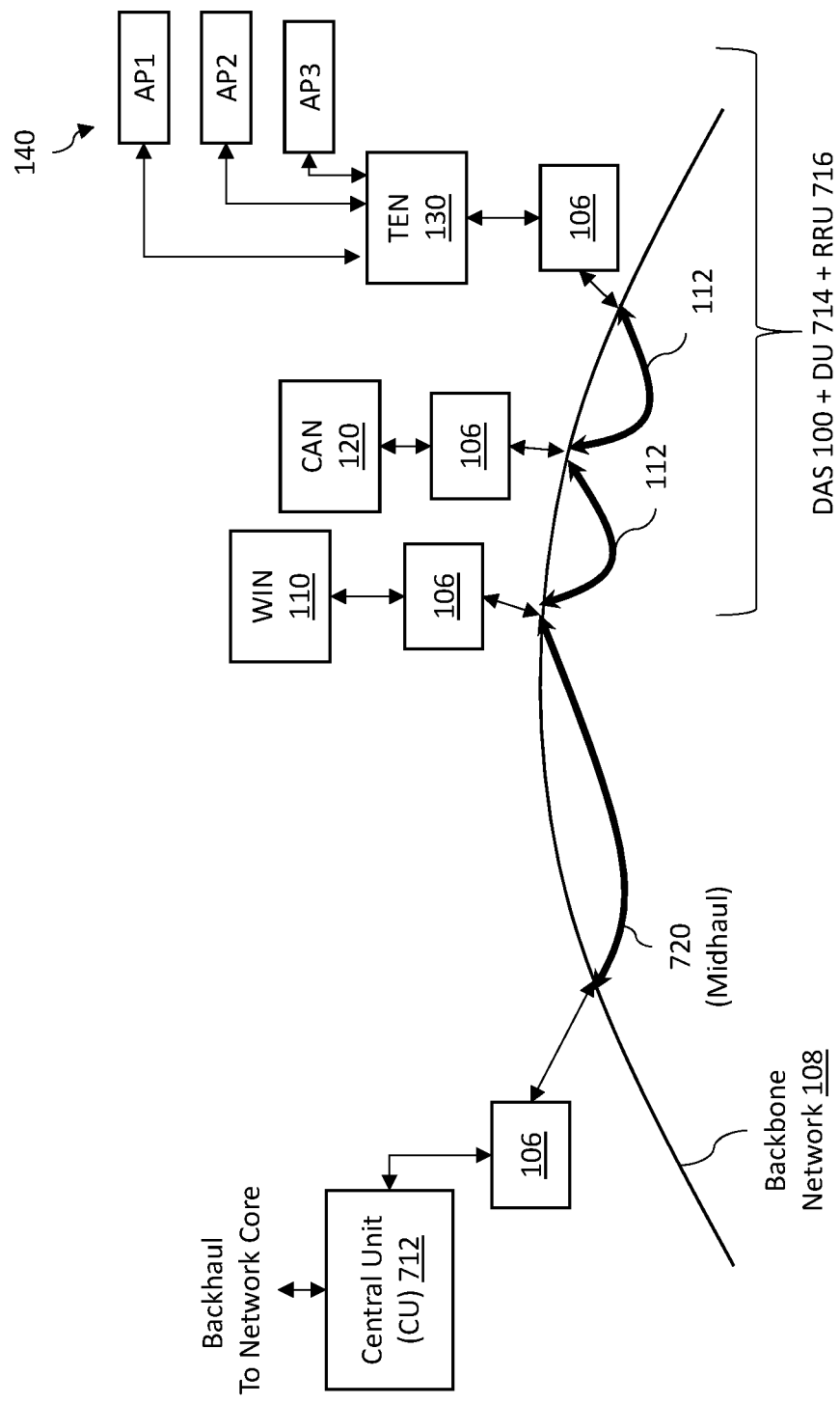

FIG. 9 illustrates an alternate embodiment where the DAS 100 interfaces with the distributed BTS 700 between the DU 714 and the RRU 716 such that the DAS 100 essentially executes the functions of the RRU 716. In such an embodiment, a virtual cable 720 establishes the fronthaul link between the DU 714 and the WIN 110 of DAS 100, and the WIN 110 executes the function of the RRU 716 to process downlink signals received from the DU 714 for distribution by the DAS 100, and process uplink signals received by the DAS 100 for transport to the DU 714. In some embodiments, the functions of the RRU 716 assumed by the DAS 100 may be distributed between the WIN 110 and the CAN 120. FIG. 10 illustrates another alternate embodiment where the DAS 100 interfaces with the distributed BTS 700 between the CU 712 and the DU 714. In this embodiments, the DAS 100 executes the functions of both the DU 714 and the RRU 716. In such an embodiment, a virtual cable 720 establishes the midhaul link between the CU 714 and the WIN 110 of DAS 100, and the WIN 110 executes the functions of both the DU 714 and the RRU 716 to process downlink signals received from the CU 712 for distribution by the DAS 100, and process uplink signals received by the DAS 100 for transport to the CU 712. In some embodiments, the functions of the DU 714 and RRU 716 assumed by the DAS 100 may be distributed between the WIN 110 and the CAN 120.

Example Embodiments

Example 1 includes a distributed antenna system, the system comprising: a central area node communicatively coupled to a backbone network, wherein the central area node is configured to communicatively couple to at least one base station via the backbone network, the central area node further configured to communicatively couple to at least one wireless access point via the backbone network; wherein the distributed antenna system is configured to use a plurality of virtual cables implemented using the backbone network, each of the plurality of virtual cables defined by a respective dedicated data channel on the backbone network; wherein the central area node is communicatively coupled to the at least one base station and the at least one wireless access point using at least some of the virtual cables; wherein downlink transport signals and uplink transport signals are transported between the central area node and the wireless access point through said at least some of the virtual cables, wherein the downlink transport signals are generated from base station downlink signals and base station uplink signals are generated from the uplink transport signals.

Example 2 includes the system of example 1, further comprising: at least one wide-area integration node communicatively coupled to the backbone network, wherein the at least one wide-area integration node is configured to communicatively couple the distributed antenna system to the at least one base station, the wide-area integration node configured to communicate the base station downlink signals and the base station uplink signals with the at least one base station; wherein the wide-area integration node and the central area node are communicatively coupled to one another using the at least some of the virtual cables.

Example 3 includes the system of example 2, wherein the at least one wide-area integration node receives analog radio frequency (RF) base station downlink signals from the at least one base station and transmits analog radio frequency (RF) base station uplink signals to the at least one base station.

Example 4 includes the system of any of examples 2-3, wherein the at least one wide-area integration node converts the analog radio frequency (RF) base station downlink signals into a digital downlink transport signal for transport over the plurality of virtual cables.

Example 5 includes the system of any of examples 2-4, wherein the at least one wide-area integration node receives digitized radio frequency (RF) base station downlink signals from the at least one base station and transmits digitized radio frequency (RF) base station uplink signals to the at least one base station.

Example 6 includes the system of any of examples 2-5, wherein the at least one wide-area integration node comprises a first wide-area integration node coupled to a central area node by the plurality of virtual cables, and a second wide-area integration node coupled to the central area node by the plurality of virtual cables, wherein the first wide-area integration node is configured to communicate a first set of base station downlink signals and base station uplink signals with a first base station, wherein the second wide-area integration node is configured to communicate a second set of base station downlink signals and base station uplink signals with a second base station; wherein the central area node is configured to distribute combined wireless services of the first base station and the second base station within a coverage area of the distributed antenna system through the at least one radio frequency wireless access point.

Example 7 includes the system of any of examples 1-6, further comprising: at least one transport extension node communicatively coupled to the backbone network, wherein the transport extension node is coupled to the at least one wireless access point; wherein the at least one transport extension node and the central area node are communicatively coupled to one another using the at least some of the virtual cables.

Example 8 includes the system of example 7, wherein the at least one transport extension node comprises a first transport extension node coupled to a central area node by the plurality of virtual cables, and a second transport extension node coupled to the central area node by the plurality of virtual cables, wherein the first transport extension node is coupled to a first plurality of radio frequency wireless access points, and wherein the second transport extension node coupled to a second plurality of radio frequency wireless access points; wherein the central area node is configured to distribute wireless services of at least one base station within a coverage area of the distributed antenna system through the first plurality of radio frequency wireless access points and the second plurality of radio frequency wireless access points.

Example 9 includes the system of any of examples 1-8, wherein the backbone network comprises at least one of: a Synchronous Digital Hierarchy Network (SDH), a Synchronous Optical Network (Sonet), an Optical Transport Network (OTN), or an Ethernet Network.

Example 10 includes the system of any of examples 1-9, wherein the backbone network comprises at least one of: the Internet; or a public infrastructure network.

Example 11 includes the system of any of examples 1-10, wherein the plurality of virtual cables are each data channels on the backbone network comprising distinct uplink and downlink communications subchannels.

Example 12 includes the system of any of examples 1-11, wherein the central area node combines uplink signals received from the at least on wireless access point.

Example 13 includes the system of any of examples 1-12, wherein the central area node is configurable to manage which of the at least one base station services are accessible through which of the plurality of access points.

Example 14 includes the system of any of examples 1-13, wherein the at least one wireless access point comprises a plurality of radio frequency wireless access points.

Example 15 includes the system of any of examples 1-14, wherein the at least one radio frequency wireless access point receives the downlink transport signal, converts the downlink transport signal to analog radio frequency (RF) signals for over-the-air transmission, and broadcasts the analog radio frequency (RF) signals as wireless downlink RF signals to one or more user devices within a coverage area of the distributed antenna system.

Example 16 includes the system of any of examples 1-15, further comprising a common management system, wherein the common management system is configured to send control commands and obtain status information from the central area node and configure the backbone network through a backbone network management interface.

Example 17 includes a method for a distributed antenna system, the method comprising: communicatively coupling a central area node of the distributed antenna system to a backbone network, wherein the central area node is configured to communicatively couple to at least one base station via the backbone network, the central area node further configured to communicatively couple to at least one wireless access point via the backbone network; establishing a plurality of virtual cables implemented using the backbone network, each of the plurality of virtual cables using a respective data channel of the backbone network, wherein the central area node is communicatively coupled to the at least one base station and the at least wireless access point using at least some of the virtual cables; and transporting downlink transport signals and uplink transport signals between the central area node and the at least one wireless access point through said at least some of the plurality of virtual cables, wherein the downlink transport signals are generated from base station downlink signals from the to at least one base station and base station uplink signals to the at least one base station are generated from the uplink transport signals.

Example 18 includes the method of example 17, further comprising: communicatively coupling at least one wide-area integration node of the distributed antenna system to the backbone network, wherein the at least one wide-area integration node is configured to communicatively couple the distributed antenna system to the at least one base station, the wide-area integration node configured to communicate the base station downlink signals and the base station uplink signals with at least one base station; communicatively coupling at least one transport extension node of the distributed antenna system to the backbone network, wherein the transport extension node is coupled to the at least one wireless access point; and transporting the downlink transport signals and the uplink transport signals between the wide-area integration node and wireless access point through the central area node via at least some of the plurality of virtual cables.

Example 19 includes the method of example 18, wherein the at least one of the wide-area integration node, the central area node, and the at least one transport extension node are coupled to the backbone network by a respective add/drop multiplexer.

Example 20 includes the method of any of examples 18-19, wherein the at least one wide-area integration node receives analog radio frequency (RF) base station downlink signals from the at least one base station and transmits analog radio frequency (RF) base station uplink signals to the at least one base station.

Example 21 includes the method of any of examples 18-20, wherein the at least one wide-area integration node receives digital radio frequency (RF) base station downlink signals from the at least one base station and transmits digital radio frequency (RF) base station uplink signals to the at least one base station.

Example 22 includes the method of any of examples 18-21, further comprising expanding a coverage area of the distributed antenna system by coupling one or more additional transport extension nodes to the backbone network and creating a respective virtual cable for each of the one or more additional transport extension nodes.

Example 23 includes the method of any of examples 18-22, further comprising expanding a service capacity of the distributed antenna system by coupling one or more additional wide-area integration nodes to the backbone network and creating a respective virtual cable for each of the one or more additional wide-area integration nodes.

Example 24 includes the method of any of examples 17-23, wherein the backbone network comprises at least one of: a Synchronous Digital Hierarchy Network (SDH), a Synchronous Optical Network (Sonet), an Optical Transport Network (OTN), or an Ethernet Network.

Example 25 includes the method of any of examples 17-24, wherein the backbone network comprises at least one of: the Internet; or a public infrastructure network.

Example 26 includes the method of any of examples 17-25, wherein the plurality of virtual cables are each data channels on the backbone network comprising distinct uplink and downlink communications subchannels.

In various alternative embodiments, system and/or device elements, method steps, or example implementations described throughout this disclosure (such as any of the wide-area integration node, central area node, transport extension node, master unit, head-end unit, remote antenna unit, access point, base station, interfaces, or sub-parts of any thereof, for example) may be implemented at least in part using one or more computer systems, field programmable gate arrays (FPGAs), or similar devices comprising a processor coupled to a memory and executing code to realize those elements, steps, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High-Speed Integrated Circuit (VHSIC) Hardware Description Language (VHDL).

As used herein, terms such as "wide-area integration node", "central area node", "transport extension node", "master unit", "head-end unit", "remote antenna unit", "access point", "base station", each refer to non-generic device elements of a distributed antenna system that would be recognized and understood by those of skill in the art and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A distributed antenna system, the system comprising:
    a central area node communicatively coupled to a backbone network, wherein the central area node is configured to communicatively couple to at least one base station via the backbone network, the central area node further configured to communicatively couple to at least one wireless access point via the backbone network;
    wherein the distributed antenna system is configured to use a plurality of virtual cables implemented using the backbone network, each of the plurality of virtual cables defined by a respective dedicated data channel on the backbone network;
    wherein the central area node is communicatively coupled to the at least one base station and the at least one wireless access point using at least some of the virtual cables; and
    wherein downlink transport signals and uplink transport signals are transported between the central area node and the wireless access point through said at least some of the virtual cables, wherein the downlink transport signals are generated from base station downlink signals and base station uplink signals are generated from the uplink transport signals.

2. The system of claim 1, further comprising:
    at least one wide-area integration node communicatively coupled to the backbone network, wherein the at least one wide-area integration node is configured to communicatively couple the distributed antenna system to the at least one base station, the wide-area integration node configured to communicate the base station downlink signals and the base station uplink signals with the at least one base station;
    wherein the wide-area integration node and the central area node are communicatively coupled to one another using the at least some of the virtual cables.

3. The system of claim 2, wherein the at least one wide-area integration node receives analog radio frequency (RF) base station downlink signals from the at least one base station and transmits analog radio frequency (RF) base station uplink signals to the at least one base station.

4. The system of claim 2, wherein the at least one wide-area integration node converts analog radio frequency (RF) base station downlink signals into a digital downlink transport signal for transport over the plurality of virtual cables.

5. The system of claim 2, wherein the at least one wide-area integration node receives digitized radio frequency (RF) base station downlink signals from the at least one base station and transmits digitized radio frequency (RF) base station uplink signals to the at least one base station.

6. The system of claim 2, wherein the at least one wide-area integration node comprises a first wide-area integration node coupled to a central area node by the plurality of virtual cables, and a second wide-area integration node coupled to the central area node by the plurality of virtual cables, wherein the first wide-area integration node is configured to communicate a first set of base station downlink signals and base station uplink signals with a first base station, wherein the second wide-area integration node is configured to communicate a second set of base station downlink signals and base station uplink signals with a second base station;
    wherein the central area node is configured to distribute combined wireless services of the first base station and the second base station within a coverage area of the distributed antenna system through the at least one wireless access point.

7. The system of claim 1, further comprising:
    at least one transport extension node communicatively coupled to the backbone network, wherein the transport extension node is coupled to the at least one wireless access point;
    wherein the at least one transport extension node and the central area node are communicatively coupled to one another using the at least some of the virtual cables.

8. The system of claim 7, wherein the at least one transport extension node comprises a first transport extension node coupled to a central area node by the plurality of virtual cables, and a second transport extension node coupled to the central area node by the plurality of virtual cables, wherein the first transport extension node is coupled to a first plurality of radio frequency wireless access points, and wherein the second transport extension node coupled to a second plurality of radio frequency wireless access points;
    wherein the central area node is configured to distribute wireless services of at least one base station within a coverage area of the distributed antenna system through the first plurality of radio frequency wireless access points and the second plurality of radio frequency wireless access points.

9. The system of claim 1, wherein the backbone network comprises at least one of:
    a Synchronous Digital Hierarchy Network (SDH);
    a Synchronous Optical Network (Sonet);
    an Optical Transport Network (OTN); or
    an Ethernet Network.

10. The system of claim 1, wherein the backbone network comprises at least one of:
    the Internet; or
    a public infrastructure network.

11. The system of claim 1, wherein the plurality of virtual cables are each data channels on the backbone network comprising distinct uplink and downlink communications subchannels.

12. The system of claim 1, wherein the central area node combines uplink signals received from the at least on wireless access point.

13. The system of claim 1, wherein the central area node is configurable to manage which of the wireless services of the at least one base station are accessible through which of the plurality of wireless access points.

14. The system of claim 1, wherein the at least one wireless access point comprises a plurality of radio frequency wireless access points.

15. The system of claim 1, wherein the at least one wireless access point receives the downlink transport signal, converts the downlink transport signal to analog radio frequency (RF) signals for over-the-air transmission, and broadcasts the analog radio frequency (RF) signals as wireless downlink RF signals to one or more user devices within a coverage area of the distributed antenna system.

16. The system of claim 1, further comprising a common management system, wherein the common management system is configured to send control commands and obtain status information from the central area node and configure the backbone network through a backbone network management interface.

17. The system of claim 1, wherein the at least one base station comprises a distributed base station.

18. The system of claim 17, wherein the distributed base station comprises a central unit, a distribution unit, and a remote radio unit;
wherein the distributed antenna system interfaces with the distributed base station either:
at the output of the remote radio unit;
between the distribution unit and the remote radio unit, wherein the distributed antenna system is further configured to execute one or more functions of the remote radio unit; or
between the central unit and the distribution unit, wherein the distributed antenna system is further configured to execute one or more functions of the distribution unit and the remote radio unit.

19. The system of claim 17, wherein the distributed base station comprises a central unit, a distribution unit, and a remote radio unit;
wherein one or more of the central unit, the distribution unit, and the remote radio unit are communicatively coupled by at least some of the plurality of virtual cables defined on the backbone network.

20. A method for a distributed antenna system, the method comprising:
communicatively coupling a central area node of the distributed antenna system to a backbone network, wherein the central area node is configured to communicatively couple to at least one base station via the backbone network, the central area node further configured to communicatively couple to at least one wireless access point via the backbone network;
establishing a plurality of virtual cables implemented using the backbone network, each of the plurality of virtual cables using a respective data channel of the backbone network, wherein the central area node is communicatively coupled to the at least one base station and the at least wireless access point using at least some of the virtual cables; and
transporting downlink transport signals and uplink transport signals between the central area node and the at least one wireless access point through said at least some of the plurality of virtual cables, wherein the downlink transport signals are generated from base station downlink signals from the at least one base station and base station uplink signals to the at least one base station are generated from the uplink transport signals.

21. The method of claim 20, further comprising:
communicatively coupling at least one wide-area integration node of the distributed antenna system to the backbone network, wherein the at least one wide-area integration node is configured to communicatively couple the distributed antenna system to the at least one base station, the wide-area integration node configured to communicate the base station downlink signals and the base station uplink signals with at least one base station;
communicatively coupling at least one transport extension node of the distributed antenna system to the backbone network, wherein the transport extension node is coupled to the at least one wireless access point; and
transporting the downlink transport signals and the uplink transport signals between the wide-area integration node and wireless access point through the central area node via at least some of the plurality of virtual cables.

22. The method of claim 21, wherein the at least one of the wide-area integration node, the central area node, and the at least one transport extension node are coupled to the backbone network by a respective add/drop multiplexer.

23. The method of claim 21, wherein the at least one wide-area integration node receives analog radio frequency (RF) base station downlink signals from the at least one base station and transmits analog radio frequency (RF) base station uplink signals to the at least one base station.

24. The method of claim 21, wherein the at least one wide-area integration node receives digital radio frequency (RF) base station downlink signals from the at least one base station and transmits digital radio frequency (RF) base station uplink signals to the at least one base station.

25. The method of claim 21, further comprising expanding a coverage area of the distributed antenna system by coupling one or more additional transport extension nodes to the backbone network and creating a respective virtual cable for each of the one or more additional transport extension nodes.

26. The method of claim 21, further comprising expanding a service capacity of the distributed antenna system by coupling one or more additional wide-area integration nodes to the backbone network and creating a respective virtual cable for each of the one or more additional wide-area integration nodes.

27. The method of claim 20, wherein the backbone network comprises at least one of:
a Synchronous Digital Hierarchy Network (SDH);
a Synchronous Optical Network (Sonet);
an Optical Transport Network (OTN)); or
an Ethernet Network.

28. The method of claim 20, wherein the backbone network comprises at least one of:
the Internet; or
a public infrastructure network.

29. The method of claim 20, wherein the plurality of virtual cables are each data channels on the backbone network comprising distinct uplink and downlink communications subchannels.

* * * * *